July 10, 1951 J. C. TELLIER 2,560,312

TUNING AID FOR RADIO RECEIVERS

Filed Oct. 3, 1947 2 Sheets-Sheet 1

INVENTOR.
JOSEPH C. TELLIER
BY
Brown, Denk & Synnestvedt
AGENTS

INVENTOR.
JOSEPH C. TELLIER
BY
Brown, Denk & Synnestvedt
AGENTS

Patented July 10, 1951 2,560,312

UNITED STATES PATENT OFFICE 2,560,312

TUNING AID FOR RADIO RECEIVERS

Joseph C. Tellier, Penn Wynne, Pa., assignor to Philco Corporation, Philadelphia, Pa., a corporation of Pennsylvania Application October 3, 1947, Serial No. 777,826

10 Claims. (Cl. 250—20)

Figure 1:
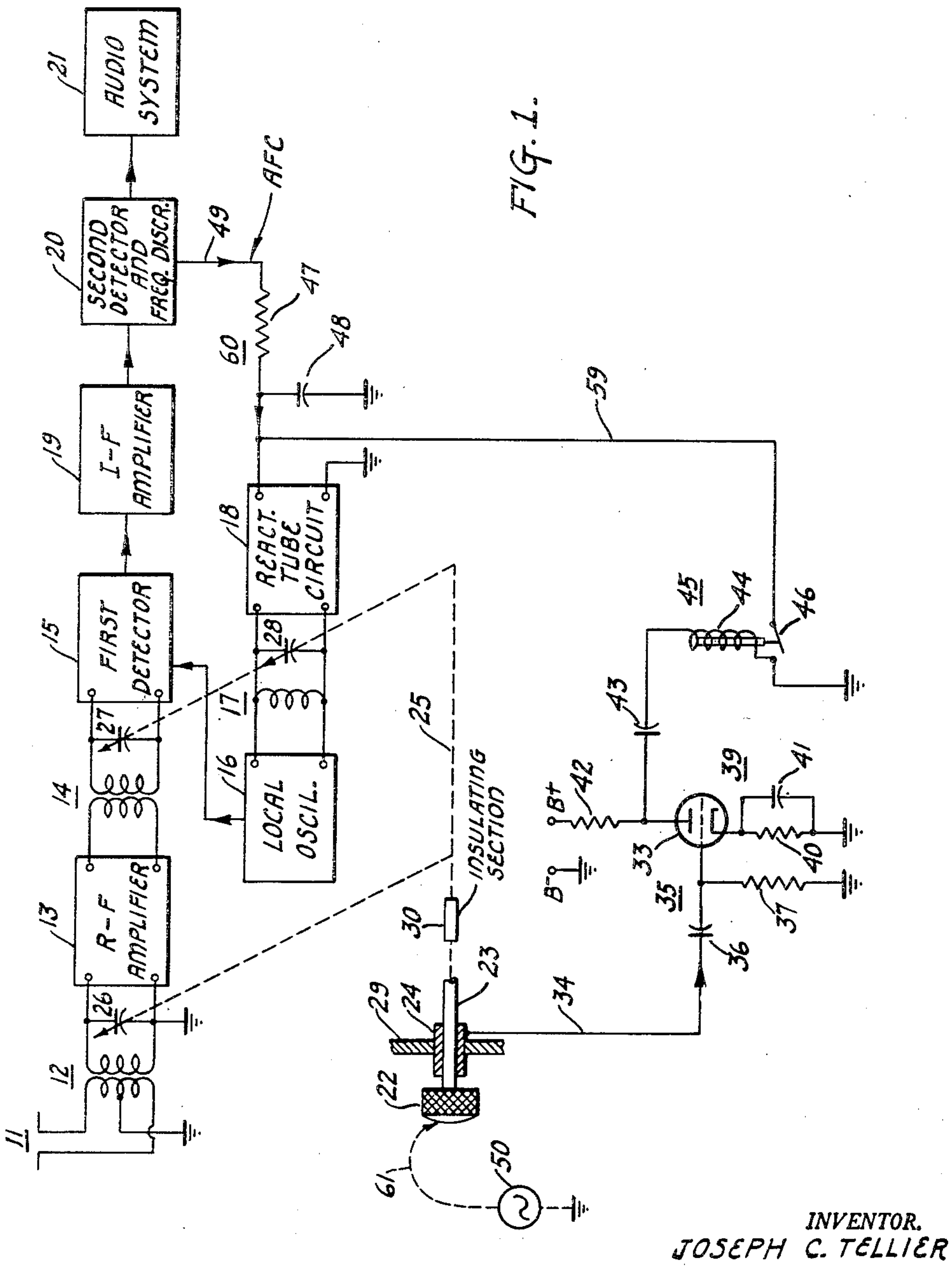

The invention herein described and claimed relates to an improvement in the manual operation of radio receivers. More particularly, the invention relates to improved means for rendering the automatic-frequency-control (AFC) system of a receiver ineffective during manual operation of the tuning-control mechanism of the receiver.

If the automatic-frequency-control (AFC) system of a radio receiver be permitted to function during manual operation of the tuning mechanism, the AFC action will tend to hold the receiver's local oscillator frequency fixed over a rather considerable tuning range on either side of a given optimum tuning point. Accordingly, the receiver will appear to tune much more broadly than would be the case if the AFC system were disabled during manual tuning. In addition, there is a tendency, in tuning such a system, to pass over many of the weaker signals, the AFC device acting to "lock in" the receiver on only the stronger carriers. To avoid these undesirable characteristics, receivers of the prior art have customarily included means for disabling the AFC system during manual tuning, as by the provision of a separate manually-operated switch, or by means of a switch coupled mechanically to the tuning mechanism and actuated automatically when the manual tuning knob is rotated.

The present invention provides improved means for disabling the AFC system of a receiver during manual operation of the tuning-control mechanism. This is accomplished electrically, rather than mechanically; and the operator is only required to perform those manual acts which are performed in any event during manual tuning.

The invention utilizes potentials which are available in the electrostatic fields inherently established by electric power lines located in the vicinity of the receiver. These electrostatic potentials are so applied to the receiver, through the agency of the operator in carrying out the ordinary manual tuning operation, that the biasing voltage developed in the automatic-frequency control system of the receiver is rendered ineffective during the time that the tuning mechanism is manually contacted.

It is an object of this invention to provide improved means for disabling the automatic-frequency-control system of a radio receiver during manual contact with the tuning mechanism.

It is another object of this invention to accomplish electrically, rather than mechanically, disablement of the automatic-frequency-control system of a radio receiver during manual tuning.

It is a feature of this invention that means are provided for utilizing the electrical potentials of the electrostatic fields inherently established by electric power lines located in the vicinity of a radio receiver to render the automatic-frequency-control system of the receiver inoperative during manual tuning.

Figure 2:
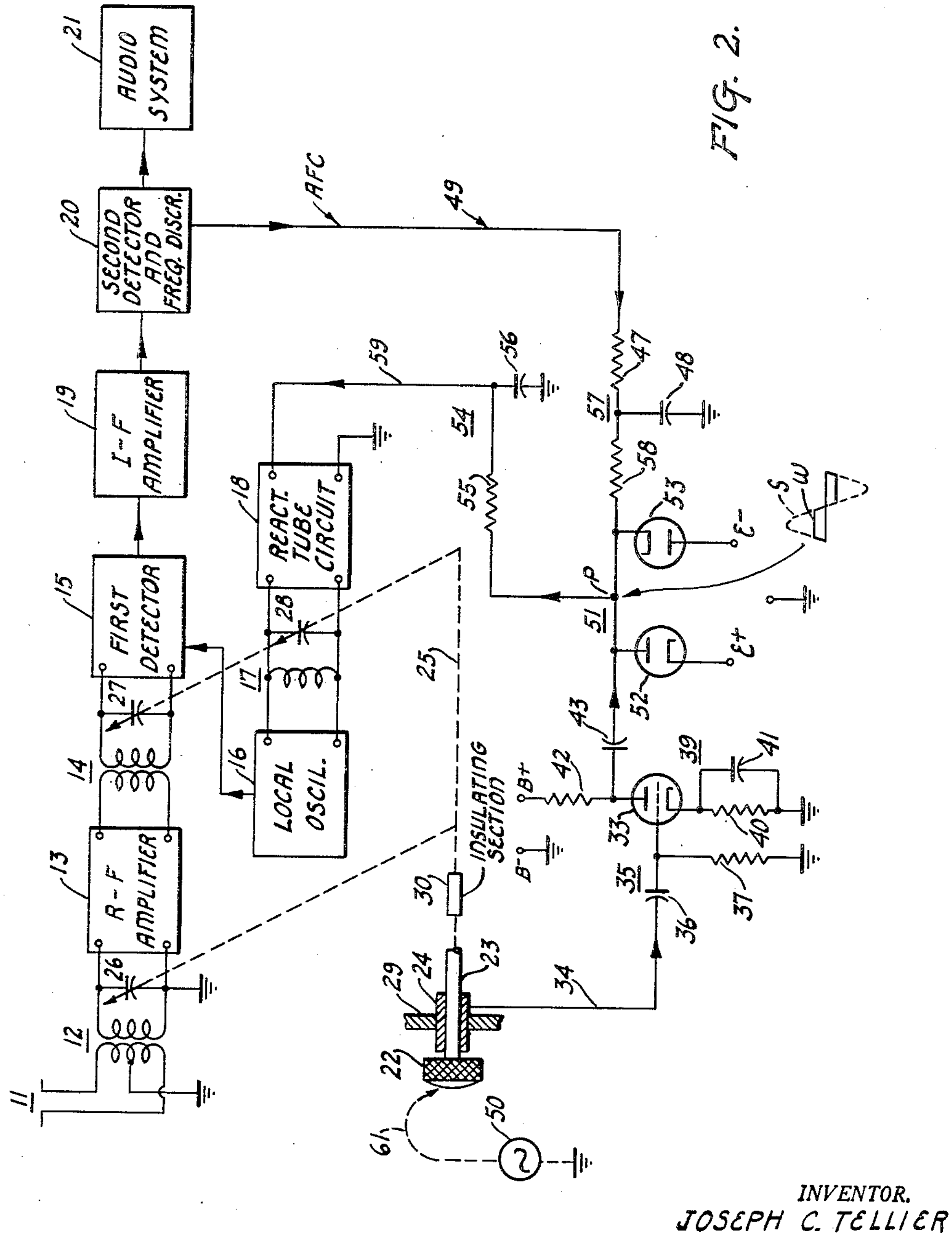

These and other objects, features, and advantages of the present invention will become clear from a consideration of the following detailed description and accompanying drawings wherein:

Figure 1 is a representation, partly diagrammatic, partly schematic, of one form of the invention; and Figure 2 is a representation of another and preferred form of the invention.

Referring now to Figure 1, there is shown a radio receiver comprised of an antenna 11, a tuned antenna transformer 12, a radio-frequency amplifier 13, a tuned R.-F. transformer 14, a first detector stage 15, a local oscillator 16 tunable through the agency of its tank circuit 17, a reactance tube circuit 18, an intermediate-frequency amplifier 19, a second detector and frequency discriminator 20, and an audio amplifier and output system 21. The present invention is applicable both to frequency-modulation and to amplitude-modulation receivers, and block 20 is intended to represent the second detector and frequency-discriminator circuits of either an F. M. or A. M. receiver.

The receiver shown in Figure 1 includes a manually-operable tuning-control knob 22 mounted on a drive shaft 23. Drive shaft 23, which may be seated in a suitable bushing member 24, is mechanically coupled to the common shaft 25 on which variable capacitors 26, 27 and 28 are ganged. These capacitors control the tuning of the antenna, radio-frequency, and local oscillator stages of the receiver, in conventional manner.

In accordance with the present invention, control knob 22, shaft 23 and bushing member 24 are constructed of material which is electrically conductive; and these elements are insulated from the chassis, and from other grounded components of the receiver, by means of the insulating bushing-support member 29 and the insulating section 30 of the shaft 25. When, as is customary, shaft 23 drives the shaft 25 through the agency of a pulley-and-dial cord arrangement, the dial cord will serve as the insulating section. In other cases, the insulating may be provided by a section interposed between the drive shaft 23 and the driven shaft 25, as is indicated diagrammatically by section 30 in the drawing.

Control knob 22 is connected electrically, by way of drive shaft 23, bushing 24, conductor 34, and network 35, to the control grid of amplifier tube 33. The network 35 may be comprised of a series capacitor 36 and a shunt resistor 37, connected as shown in the drawing. Tube 33 is preferably a high-$\mu$ tube, and may be conveniently a simple triode, as shown. The cathode of tube 33 is connected to ground, either directly or, if desired, through a biasing network 39 comprised of a resistor 40 and a capacitor 41. The plate of tube 33 is connected, by way of plate load resistor 42, to a source of positive potential, B+. The plate circuit of triode 33 is A.-C. coupled, by way of coupling capacitor 43, to the winding 44 of an alternating-current relay 45. Relay 45 has a normally-open switch 46, one contact of which is connected to ground and the other contact of which is connected, by way of conductor 59, to the input or control terminal of reactance-tube circuit 18 of the receiver's automatic-frequency-control (AFC) system. The AFC system includes frequency discriminator 20, conductor 49, filter 60, and reactance-tube circuit 18. Filter 60, comprising resistor 47 and capacitor 48, constitutes the usual audio filter of the AFC system.

The operation of the circuit of Figure 1 will now be described. When, with the intention, ordinarily, of manually tuning the receiver, the operator places his hand upon control knob 22, he automatically applies to knob 22 a potential which is derived from the ambient electric fields established by electric power circuits located in the vicinity of the receiver. The body of the operator, being exposed to the aforesaid electric fields, functions as an antenna and acquires a potential which is different from that of the radio receiver; and this difference in potential, between the operator and the receiver, is automatically applied to knob 22 when the knob is touched by the operator. The operator may therefore be considered as a source of alternating voltage, the frequency of which corresponds to the frequency of the power circuits from which the voltage is derived. In Figure 1, the operator, as a source of alternating voltage, is represented diagrammatically by the voltage source 50.

When the hand of the operator contacts knob 22, as indicated in Figure 1 by the dotted line 61, the alternating voltage, represented by source 50, is applied to the control grid of amplifier tube 33 by way of a path comprising knob 22, shaft 23, bushing 24, conductor 34 and capacitor 36. This applied voltage appears in amplified form across winding 44 of A.-C. relay 45. Relay 45, by reason of the current which now flows through its winding 44, is actuated, and switch 46 closes, thereby shorting to ground the AFC bias appearing across capacitor 48. The closing of switch 46 consequently renders the AFC system of the receiver ineffective; and this condition of ineffectiveness continues so long as the hand of the operator remains in contact with control knob 22. When, upon completion of manual tuning, the operator removes his hand from knob 22, the alternating voltage from source 50 is removed from the grid of tube 33, current ceases to flow through relay winding 44, and the switch arm of switch 46 returns to its normally-open position, thereby removing the ground connection from the AFC lead and returning the AFC system to operative condition.

The relay 45 is preferably of the slow-release type to insure that its contacts remain closed during the manual tuning process even though the operator's fingers leave the knob 22 for brief intervals during said process.

While the circuit shown in Figure 1 and described above is effective to accomplish the principal objects of this invention, I prefer to employ, in lieu of that portion of the circuit of Figure 1 which includes the relay 45, an electronic system such as is illustrated in Figure 2. The components included in Figure 2 which are common to both embodiments are identified by like reference numerals.

Referring now to Figure 2, the plate of the previously-described amplifier tube 33 is shown to be coupled, by way of blocking capacitor 43, to point $p$ of a double-diode limiter circuit 51. Limiter circuit 51 comprises diodes 52 and 53 connected in series between a source of positive potential, E+, and a source of negative potential E−. The cathode of diode 52 is connected to E+ and the anode of the diode 53 is connected to E−. The potentials E+ and E− will ordinarily be of equal magnitude and opposite polarity, for reasons that will become clear.

Point $p$ is connected, by way of low-pass filter 54, comprising series resistor 55 and shunt capacitor 56, to the input or control terminal of reactance-tube circuit 18 of the AFC system of the receiver. Point $p$ is also connected, by way of network 57 and AFC lead 49, to the source of AFC bias, i. e., to the frequency discriminator 20. Network 57 comprises series resistors 58 and 47 and capacitor 48. Resistors 58 and 47 are of high resistance and serve to isolate point $p$ from the AFC-bias lead 49. More particularly, that portion of network 57 comprising resistor 47 and capacitor 48 serves, as in Figure 1, as a low-pass filter to keep the audio signals out of the reactance-tube circuit 18; and that portion of network 57 which comprises resistor 58 and capacitor 48 functions to keep voltages of power-line frequency, i. e., voltages having the frequency of source 50, away from the AFC-bias lead 49 and out of the audio system 21. Resistor 58 also serves to isolate point $p$ from ground with respect to alternating voltages, as otherwise capacitor 48 would be a low impedance shunt to plate load resistor 42 and alternating voltages of adequate amplitude would not be developed at point $p$.

The magnitudes of potentials E+ and E− are so chosen as to be beyond the anticipated excursions of the AFC bias. For example, if a maximum AFC-bias excursion of from plus five volts to minus five volts is expected, the potentials E+ and E− may conveniently be plus ten volts and minus ten volts, respectively.

It will be seen then that when the alternating-voltage source 50 is not coupled to the grid of tube 33, and diodes 52 and 53 are not conducting, as is the case when the hand of the operator is not in contact with knob 22, the potential at point $p$ may vary within the limits established by E+ and E−; and at any instant the potential of point $p$ corresponds to the AFC bias developed by frequency discriminator 20 across capacitor 48. This bias is applied to the control element of reactance-tube circuit 18 by way of resistors 58 and 55.

However, when the hand of the operator is in contact with knob 22, as is the case during tuning, the alternating-voltage source 50 is then coupled to the grid of tube 33 and an amplified alternating potential, having the waveform represented in Figure 2 by wave S, tends to be developed on the plate of tube 33. The peak amplitudes of the amplified alternating wave S are desirably substantially larger than the magnitudes of potentials E+ and E−. The action of limiter circuit 51 cuts off both the positive and the negative peaks of the wave S, and the potential of point *p*, therefore, has the clipped waveform shown in Figure 2 by the solid-line waveform W.

To illustrate the above, assume that the voltage wave from source 50 which is applied to the control grid of tube 33 has a peak amplitude of one volt. Assume that the gain of the amplifier stage is fifty. In such case, the potential of point *p* would, in the absence of the limiter circuit 51, vary between peak amplitudes of plus and minus fifty volts. However, the action of limiter circuit 51, prevents point *p* from rising above plus ten volts or falling below minus ten volts, assuming these to be the limits established by the potential sources E+ and E−.

Filter 54 has a time constant which is long relative to one cycle of voltage wave S, and therefore only the D.-C. component of the clipped voltage wave W is developed across capacitor 56. This D.-C. component is applied to reactance-tube circuit 18 by way of conductor 59. When the potentials E+ and E− comprise voltages which are above and below ground by equal amounts, as will ordinarily be the case, the D.-C component of the clipped voltage wave W developed across capacitor 56 will be zero, or substantially zero, in value. This assumes that the amplified alternating voltage wave S is sufficiently large to permit the clipped wave W to have steep sides, i. e., to approach a square wave in form.

In the circuit of Figure 2, the AFC-bias lead 49 is effectively isolated from point *p* by series resistors 58 and 47, these resistors being of relatively high value. Consequently, the zero bias, which is developed across capacitor 56 during manual operation of the tuning mechanism, is applied to reactance-tube circuit 18 substantially unaffected by the action of the frequency-discriminator 20.

The time constant of filter 54 may, if desired, be sufficiently long to maintain the D.-C. potential across capacitor 56 at zero during such momentary physical release of knob 22, by the fingers of the operator, as may occur during rotation of the knob when manually tuning.

A circuit built in accordance with Figure 2 operated in a very satisfactory manner to accomplish the stated objectives of this invention. The circuit referred to had the following constants:

| | | |
|---|---|---|
| Tube 33 | | 7C6 |
| Diodes 52 and 53 | | 6H6 |
| Voltage derived at source 50 | volt (approx.) | 1.0 |
| Capacitors 43, 56, 48 | μf | 0.1 |
| Capacitor 36 | μf | .001 |
| Resistor 37 | megohms | 10.0 |
| Resistor 42 | megohm | 0.1 |
| Resistors 55, 58 and 47 | megohm | 1.0 |
| E+ | volts | +10 |
| E− | volts | −10 |

It will be understood that the AFC bias reference value is usually zero and that the potential sources E+ and E− will ordinarily constitute voltages which are above and below ground by equal amounts. However, if the reference AFC bias is a value other than zero, the potentials E+ and E− will comprise voltages which are above and below the AFC reference value by equal amounts.

The improvement provided by the present invention may be incorporated into a receiver which obtains its principal source of power either from alternating-current mains, or from direct-current mains, or from a battery. The requirement, insofar as the present invention is concerned, is that the receiver be located within the ambient electric fields of a power supply line. The supply line will ordinarily carry alternating current. However, if the receiver be located in the vicinity of a direct-current line, rather than an alternating-current line, an alternating voltage will nevertheless be derived by the operator which will be due to commutator ripple in the line voltage. The ripple voltage is ordinarily small compared to the voltage available in an A.-C. system, but this is at least partially compensated for by the fact that the ripple voltage is substantially higher in frequency and the coupling between the line and the operator is correspondingly greater.

It was stated previously hereinabove that the tuning control knob 22 should be constructed of material which is electrically conductive. Any of the usual metals from which receiver components and fittings are ordinarily made will be satisfactory for this purpose. However, if, in accordance with conventional practice, it is preferred to mould the knob from a plastic material, this may be done through suitable choice of an electrically-conducting plastic material, of which a number of types are available commercially. In some instances, it may be sufficient to employ an insulated knob having a relatively large conductive core or bushing insert, reliance being placed on the presence of capacity coupling between the hand of the operator and the bushing insert.

Although not preferred, a separate knob or terminal may be provided as the element to be contacted to remove the AFC bias. In such an arrangement, the operator may, if he desires to prevent AFC action during the tuning process, contact the designated terminal with, for example, his left hand while manipulating a conventional manual-tuning knob with his right hand.

Having described several embodiments of my invention, I claim:

1. In a radio receiver having a chassis and having an automatic-frequency-control system for developing and utilizing an automatic-frequency-control bias, said receiver being adapted for use in the vicinity of electric power circuits and within the ambient electric fields which inherently surround said power circuits; manual control means, at least a portion of said control means being electrically conductive; means for insulating said conductive portion of said control means from said chassis; and means, responsive to potentials of said ambient electric fields inherently applied to said control means when said receiver is within said fields and said control means is contacted by the human hand, for reducing the utilized automatic-frequency-control bias substantially to zero during the time said control means is manually contacted.

2. The combination claimed in claim 1 characterized in that said control means is employed for manually tuning said receiver.

3. In a radio receiver adapted for use in the vicinity of alternating-current electric power circuits and within the ambient electrostatic fields which inherently surround said power circuits, said receiver having a chassis and an automatic-frequency-control system for developing and utilizing an automatic-frequency-control bias, the combination of: means for manually tuning said receiver to a desired carrier frequency, said tuning means including a control element adapted to be manually manipulated, said element having a conductive portion insulated from said chassis; means, responsive to potentials of said ambient electric fields inherently applied to said control element when said receiver is within said fields and said element is contacted manually, for developing an alternating voltage within said receiver during the time said element is so contacted; and means for utilizing said developed alternating voltage to reduce the effective bias of said automatic-frequency control-system to substantially zero during the time said control element is so contacted.

4. In a radio receiver having a controllable local oscillator and an automatic-frequency-control system for said oscillator, said system including means for developing an automatic-frequency-control bias and frequency-control means associated with said oscillator responsive to said bias, said bias having a reference value at a selected intermediate frequency, said receiver being adapted to be energized by alternating current from electric power circuits, said circuits being inherently surrounded by ambient electric fields, the improvement which comprises the provision of: means for tuning said receiver to a desired carrier wave, said means including a manually-operable tuning control at least a portion of which is electrically conductive; means, responsive to potentials of said ambient electric fields inherently applied to said tuning control when said tuning control is manually contacted while said receiver is within said fields, for developing an alternating voltage within said receiver during the time said tuning control is so contacted; and means for so combining said developed alternating voltage with said bias that the direct-current component of said combined voltages is substantially equal to said reference value of said bias.

5. In a radio receiver adapted to be powered from alternating-current electric power lines, said power lines being inherently surrounded by ambient electric fields, said receiver having an automatic-frequency-control system for developing and utilizing an automatic-frequency-control bias, the improvement which comprises the provision of: tuning means adapted to be manipulated manually, at least a portion of said tuning means being electrically conductive; means, energized in response to potentials of said ambient electric fields applied to said tuning means when the receiver is within said fields and a part of the human body is in contact with said conductive portion of said tuning means, for developing a voltage within said receiver; and means for utilizing electronically said developed voltage to modify said bias during the said time that a part of the human body is in contact with said conducting portion of said tuning means.

6. The combination claimed in claim 4 characterized in that said means for combining said alternating voltage with said bias includes: a limiter circuit comprising first and second diodes connected in series between sources of first and second direct-current potentials, the magnitudes of said first and second potentials differing from said reference value of said bias by equal amounts and opposite signs; means for connecting the source of said bias to the anode-cathode junction of said series-connected diodes; means for applying said alternating voltage to said junction; and filter means for deriving said direct-current component.

7. In a radio receiver having a controllable local oscillator, a chassis, and an automatic-frequency-control system including means for developing an automatic-frequency-control bias, said bias having a zero reference value at a preselected intermediate frequency, said receiver being adapted for use in the vicinity of electric power circuits within the ambient electric fields which inherently surround said electric power circuits, the improvement which comprises the provision of: means for tuning said receiver to a desired carrier wave, said means including a manually-operable tuning control, at least a portion of said tuning control being electrically conductive; means for insulating said conductive portion of said tuning control from said chassis; means, including said conductive portion of said tuning control, for developing automatically an alternating voltage within said receiver when said tuning control is contacted manually, said last-named means being responsive to the ambient potentials inherently produced in said conductive portion of said tuning control when said tuning control is contacted manually; and means for so combining said developed alternating voltage with said bias during said manual contact of said tuning control that the direct-current component of said combined voltages is substantially zero.

8. The combination claimed in claim 7 characterized in that said means for combining said alternating voltage with said bias includes: a limiter circuit comprising first and second diodes connected in series between sources of first and second direct-current potentials, the magnitudes of said first and second potentials differing from said zero reference value by equal amounts and opposite signs; means for connecting the source of said bias to the anode-cathode junction of said series-connected diodes; means for applying said alternating voltage to said junction; means, including an impedance of relatively large value, connecting said junction to the source of bias; and filter means for deriving said direct-current component.

9. In a radio receiver having a controllable local oscillator, a chassis, and an automatic-frequency-control system for said oscillator, said system including means for developing an automatic-frequency-control bias and oscillator frequency-control means responsive to said bias, said bias being of reference value at a preselected intermediate frequency, the improvement which comprises the provision of: means for tuning said receiver to a desired carrier wave, said tuning means including a manually-operable tuning control, at least a portion of said tuning control being conductive; means for insulating said conductive portion of said tuning control from said chassis; a limiter circuit comprising first and second diodes connected in series between sources of first and second direct-current potentials, said first potential being above said bias reference value by a selected amount, said second potential being below said reference value by an equal amount; an alternating-current path coupling said conductive portion of said tuning control to a point in said limiting circuit, said point comprising the anode-cathode junction of said serially-connected diodes; means connecting said point to said source of bias; and means, including a low-pass filter, connecting said point to said frequency-control means of said local oscillator.

10. In a radio receiver having a controllable local oscillator, a chassis, and an automatic-frequency-control system, said system including means for developing an automatic-frequency-control bias and oscillator frequency-control means responsive to said bias, said bias being of reference value at a preselected intermediate frequency; means for tuning said receiver to a desired carrier wave, said tuning means including a manually-operable tuning control, at least a portion of said tuning control being conductive; means for insulating said conductive portion of said tuning control from said chassis; a limiter circuit comprising first and second diodes connected in series between sources of first and second direct-current potential, said first potential being above said bias reference value by a selected amount, said second potential being below said reference value by an equal amount; an alternating-current path coupling said conductive portion of said tuning control to the anode-cathode junction of said serially-connected diodes, said path including an alternating-current amplifier; means, including a low-pass filter, connecting said anode-cathode junction to said source of bias; and means, including a low-pass filter, connecting said junction to said frequency-control means of said local oscillator.

JOSEPH C. TELLIER.

REFERENCES CITED

The following references are of record in the file of this patent:

UNITED STATES PATENTS

| Number | Name | Date |
|---|---|---|
| 1,900,596 | Whitney | Mar. 7, 1933 |
| 2,186,825 | Dome | Jan. 9, 1940 |
| 2,282,973 | Koch | May 12, 1942 |
| 2,283,523 | White | May 19, 1942 |
| 2,287,925 | White | June 30, 1942 |
| 2,294,100 | Travis | Aug. 25, 1942 |
| 2,340,429 | Rankin | Feb. 1, 1944 |